July 7, 1936.  H. L. GRISWOLD  2,047,100
FREIGHT CAR SEAL
Filed April 1, 1936
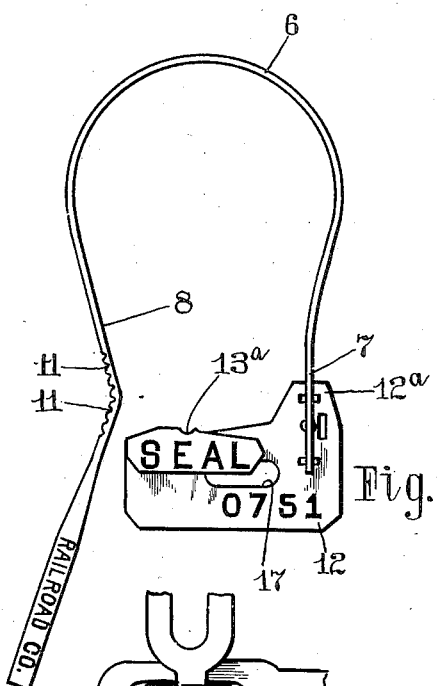
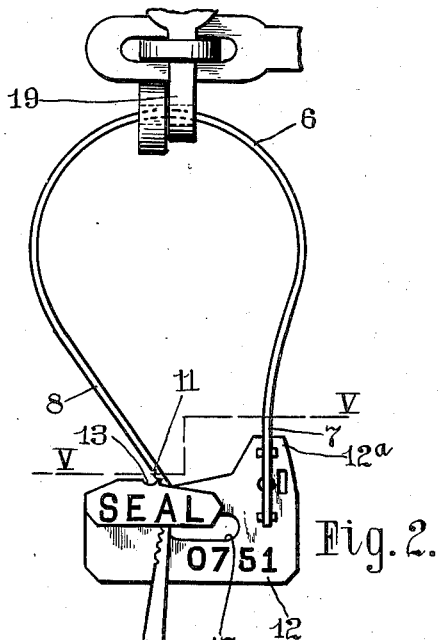
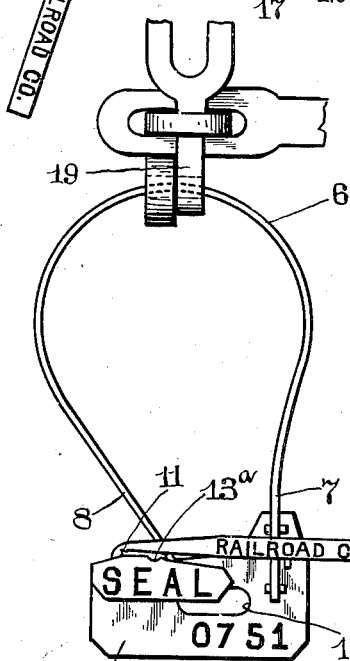
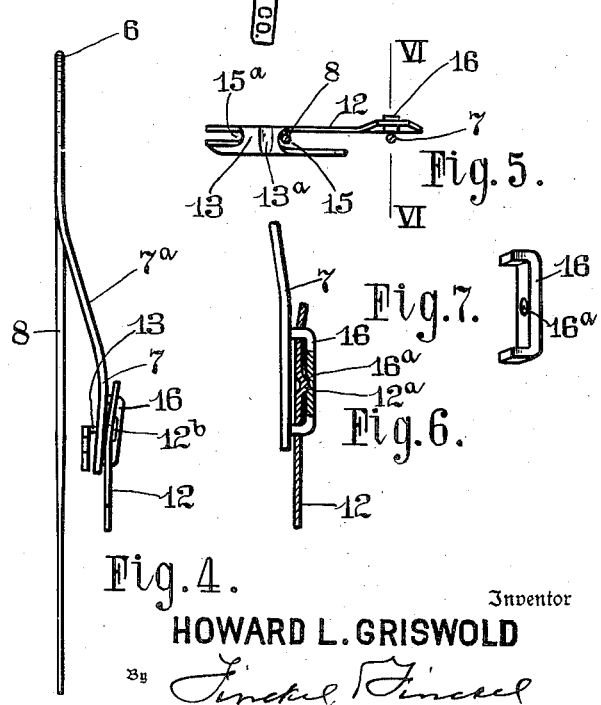
Inventor
HOWARD L. GRISWOLD
By Finckel & Finckel
Attorneys Patented July 7, 1936

2,047,100

UNITED STATES PATENT OFFICE 2,047,100

FREIGHT CAR SEAL

Howard L. Griswold, Columbus, Ohio, assignor to The Miller Seal Company, Columbus, Ohio, a corporation of Ohio Application April 1, 1936, Serial No. 72,122

5 Claims. (Cl. 292—315)

The problem of thwarting theft from freight cars and other containers of merchandise is difficult of solution. The present invention is intended more especially for use in sealing the doors of railroad freight cars, but it can be used in many other places, as for example, upon meters or boxes, the object of the invention being to provide an improved and simplified construction whereby indubitable evidence will result from unauthorized removal or tampering with it.

The invention is embodied in the example herein shown and described, the features of novelty being finally claimed.

In the accompanying drawing—

Figure 1 is a front view of the seal according to my invention before applied, as to the latching members of a door.

Fig. 2 is a similar view showing the device so applied but with the frangible shank of the loop or shackle hooked in one of the notches of the number plate but unbent to sealing position.

Fig. 3 is a similar view showing the frangible shank bent to sealing position.

Fig. 4 is an edge view looking to the left Fig. 1.

Fig. 5 is a plan view, taken from the line V—V Fig. 2, of the upper edge of the number plate member of the device with parts in section.

Fig. 6 is a sectional view on a larger scale on the line VI—VI Fig. 5 of a fraction of said plate member showing the iron or steel U-shaped member connecting one shank of the wire shackle with the number plate member.

Fig. 7 is a perspective view, on a larger scale, of the said U-shaped shank holder.

Referring to the views the wire part or shackle can be of ordinary thirteen or fourteen gauge which is preferably of galvanized iron or steel and not readily fusible, and comprises a top loop portion 6 having two shank portions 7 and 8, one of which, 8 is somewhat longer than the other. The shank 8 is provided with a series of notches 11 at that side toward which it is to be bent as best shown in Fig. 1.

12 designates what, for convenience, I term the number plate, it consisting of a piece of sheet metal as, for example, zinc readily fusible by a torch, said plate being cut and bent at its upper edge to form an integral offset portion of T-form in plan view (see Fig. 5) thereby providing a neck or stem 13 with a depression 13ª therein connecting the head portion with the body of the plate so that it shall be firmer at that portion to permit the free shank member 8 to be bent around it. The said offset head portion has the letters of the word "Seal" pressed in it so as to be easily fracturable or disfigured upon an attempt to bend or roll it up. Said head portion forms with the body of the metal part two recesses or notches, as shown at 15 and 15ª (Fig. 5) of sufficient width to permit the longer or free shank 8 of the wire shackle to be inserted laterally therein for bending said shank around the stem 13.

The shorter shank 7 is attached to the plate 12 by welding to it an elongated U-shaped member 16 of flat iron or steel wire (see Fig. 7). The legs of the member 16 are inserted through two holes in the upper portion of the plate 12, said plate preferably having an upward extension 12ª to receive one leg of said member 16 and facilitate the welding operation. In practice the welding of the member 16 to shank 7 is effected by the usual electric current while the parts are in a bath of oil in order to avoid melting the plate 12. The securing means just described prevents turning of the shank 7, and is difficult to repair.

The short shank is slanted forward, as shown at 7ª, in Fig. 4, so as to position that shank well in front of the plate 12 and therefore facilitate the threading of it through the member to be sealed.

To obstruct unauthorized lateral removal of the shank 7 and the attached member 16 from the plate 12 by slitting and bending the margin of the plate 12 on lines intersecting the holes for the legs of the member 16, said member 16 is provided with an indentation 16ª at its inner side engaged by a nodule 12ª pressed out in the plate 12. Cooperating with said means for preventing the lateral removal of the shank 7 is a stop 12ᵇ in the number plate at the forward side of the plate near and opposite the middle of said plate 12.

The flattened end portion of the shank 8 can be peculiarly impressed on one or both sides with particular markings, such as shown, to make it difficult and expensive to duplicate.

In applying the seal as thus constructed it is only necessary to first thread the longer shank 8 of the seal through the latch 19, on the car and door, spring the said free or longer shank into position to react into the notch 15, as shown in Fig. 2, and then bend the said shank upward into the notch 15ª and closely around the neck 13 to a position like that shown in Fig. 3 so that it cannot be drawn forwardly off the neck.

The notches on the outer side of the shank 8 are of such depth that the wire can be bent around the neck 13 in the manner shown and described without fracturing it, but when bent in the opposite direction, as in an attempt to unauthorizedly release said shank from the T-head it will inevitably be broken and thereby make it plain that the seal has been tampered with.

The lettering on the T-head makes it practically impossible to roll up the T-head, as with a pair of pliers, for the purpose of drawing the loop of the shank 8 forwardly from the stem of the T-head without leaving said T-head and seal grossly disfigured.

It will be observed that all the parts of the seal are visible and the indicia thereon in plain view for inspection or for the taking of records by an employee.

The body of the number plate 12 is provided with a hole 17 for stringing and shipping purposes, it being desirable to keep the seals in numerical order for use by the employees in applying the seal. The portion of the plate 12 below said hole 17 can be impressed with an identifying serial number in order that the railroad agent upon the arrival of the car at its destination may have or make a record of the fact.

The forms of the parts can be changed without departing from the gist of the invention as claimed.

What I claim is:

1. In a seal of the kind described including a wire loop having shanks, a plate of readily fusible material having a T-head, and means securing one of said shanks to said plate consisting of a member of elongated U-form, the legs of which are extended through said plate and welded to said shank.

2. In a seal of the kind described including a wire loop having shanks, a plate of readily fusible material having a T-head, means securing one of said shanks to said plate consisting of a member of elongated U-form, the legs of which are extended through said plate and welded to said shank, and a nodule on said plate engaging said member of U-form.

3. In a seal of the kind described including a wire loop having shanks and a plate of readily fusible material having a T-head, means securing one of said shanks to said plate consisting of a member of elongated U-form, the legs of which are extended through said plate and welded to said shank, and a stop on said plate tending to prevent lateral removal of said member of U-form while connected with said shank.

4. In a seal of the kind described including a wire shackle having shanks, one of which is frangible and the other non-frangible, and a plate of readily fusible material having a T-head, means securing the non-frangible shank to said plate consisting of a member of elongated U-form, the legs of which latter are extended through said plate and welded to said shank, said frangible shank adapted to be bent in one direction around the stem of said T-head without breaking but breakable when bent in the opposite direction in an attempt to detach the same from said stem.

5. In a seal of the kind described including a wire loop having shanks and a plate of readily fusible material having a T-head, means securing one of said shanks to said plate consisting of a member of elongated U-form, the shanks of which latter are extended through said plate and welded to said leg, a nodule on said plate engaging said member of U-form, and a stop on said plate tending to obstruct the removal of said member of U-form and the shank from said plate.

HOWARD L. GRISWOLD.